United States Patent [19]
Mori et al.

[11] Patent Number: 5,475,422
[45] Date of Patent: Dec. 12, 1995

[54] METHOD AND APPARATUS FOR RECONSTRUCTING THREE-DIMENSIONAL OBJECTS

[75] Inventors: Takeaki Mori, Yokosuka; Satoshi Suzuki; Takayuki Yasuno, both of Yokohama, all of Japan

[73] Assignee: Nippon Telegraph and Telephone Corporation, Tokyo, Japan

[21] Appl. No.: 262,541

[22] Filed: Jun. 20, 1994

[30] Foreign Application Priority Data

Jun. 21, 1993 [JP] Japan .................................. 5-149334

[51] Int. Cl.[6] .................................................. H04N 13/02
[52] U.S. Cl. .................................................. 348/48
[58] Field of Search ....................... 348/48; H04N 13/02

[56] References Cited

U.S. PATENT DOCUMENTS

| | | | |
|---|---|---|---|
| 4,062,045 | 12/1977 | Iwane | 348/48 |
| 4,541,007 | 9/1985 | Nagata | 348/48 |
| 4,956,705 | 11/1990 | Wright | 348/50 |
| 5,049,987 | 9/1991 | Hoppenstein | 348/48 |

Primary Examiner—Howard W. Britton
Attorney, Agent, or Firm—Pollock, VandeSande and Priddy

[57] ABSTRACT

One of the images of an object captured by at least three cameras is defined as a basic image, and a basic backprojection line is defined which passes through a feature point in the basic image corresponding to a noted three-dimensional feature point on the object and the optical center of the camera that captured the basic image. Reference backprojection lines are defined with respect to respective feature points on an epipolar line, obtained by projecting the basic backprojection line onto the image by each of the other cameras, and the optical center of said each camera. The coordinates of intersection points of the basic backprojection line and the reference backprojection lines are calculated and the number of the reference backprojection lines intersecting at each intersection point on the basic backprojection line is counted. The point having the maximum number of intersections is determined to be the position of the noted three-dimensional feature point. Similar processing is performed for all of the feature points in the basic image, by which the positions of corresponding three-dimensional feature points of the object are determined.

22 Claims, 6 Drawing Sheets

METHOD AND APPARATUS FOR RECONSTRUCTING THREE-DIMENSIONAL OBJECTS

BACKGROUND OF THE INVENTION

The present invention relates to measurements of the position, shape and movement of a three-dimensional moving object and, more particularly, to a three-dimensional information reconstruction or recovery method and apparatus which can be used in the fields of three-dimensional information reconstruction, recognition and description (CG) of moving objects.

Conventional three-dimensional information reconstruction techniques can be classified into three categories. A first technique is stereopsis. This technique is one that establishes correspondence of points or lines between two right and left images taken by two cameras and estimates, from the positions of the cameras and pairs of corresponding points or lines on the right and left images, the positions of points and lines on a scene space corresponding to the pairs of corresponding points or lines. A second technique is a three-dimensional information recovery method using a moving camera. This is a method which tracks individual feature points on a number of images picked up by a moving camera and estimates the positions of points on a scene space corresponding to the feature points. A third technique is a backprojection method, which recovers or reconstructs a three-dimensional structure of an object in a scene space by projecting back feature points in images to the scene space.

With the first technique (see, for example, Kanade T., Okutomi T. and Nakahara M., "A multiple baseline stereo method," Proc. Image understanding Workshop, pp. 409–426, 1992 or U.S. Pat. No. 4,654,872), many points on the surface of the object tend to be occluded from the sight line of either one of the cameras because of uneven object surface, and hence accurate positions of the corresponding feature points between the right and left images cannot be obtained, making it hard to obtain highly accurate three-dimensional information. The second technique (see, for example, Bolles R. C., Baker H. H. and Marimont D. H.: "Epipolar-plane image analysis: an approach to determining structure from motion," IJCV, Vol. 1, No. 1, pp. 7–55, 1987) cannot be applied to a moving object, because the object needs to stand still during its image capturing session by a moving camera. Recently, there has been proposed a technique which permits simultaneous extraction of the three-dimensional shape and motion of an object from many images taken by a single camera (see Tomasi C. and Tanade T.: "Shape and motion from image streams under orthography: a factorization method," IJCV, Vol. 9, No. 2, pp. 137–154, 1992). This technique recovers three-dimensional information basically by tracking feature points between the images; therefore, this method cannot obtain accurate three-dimensional information because the surface of the object partly occluded from the sight line of the camera while the camera or the object is moving. The reason for this is that since a noted feature point on the images repeatedly gets out of and into the view field, the locus of the feature points on the images frequently breaks, introducing difficulty in tracking the feature point. Hence, this technique is not suitable for use with a moving object. A third technique is a silhouette projection method (see, for example, Ahuja N. and Veenstra J.: "Generation octree from object silhouettes in orthographic views," IEEE Trans. PAMI, Vol. 11, No. 2, pp. 137–149, 1989). With this method, however, it is very difficult to acquire accurate three-dimensional information, because the generation of silhouette images is extremely difficult and unstable. Another example of the third technique is a method which recover or reconstruct edges of a three-dimensional object by extracting edges on images and giving a voting to the scene space through use of the extracted edges (see, for example, Hamano T., Yasuno T. and Ishii K.: "Direct estimation of structure from non-linear motion by voting algorithm without tracking and matching," Proc. of ICPR, Vol. 1, pp. 505–508, 1982 and S. Kawato: "3D Shape Recovering by Octree Voting Technique," PROCEEDINGS of SPLE-The International Society for Optical Engineering, 15–16 November 1992). With such a method, however, since a plurality of feature points are simultaneously extracted, processes for the respective feature points interfere with each other, incurring possibility of a false feature point being extracted. A large number of images are needed to solve this problem. For a moving object, however, much time is consumed to take many images by one camera and a simultaneous image pickup system using many cameras is very expensive.

SUMMARY OF THE INVENTION

It is therefore an object of the present invention to provide a method and apparatus which permit the acquisition or recovery of three-dimensional information of an object from its images taken by a small number of cameras.

A three-dimensional information recovery method according to a first aspect of the invention comprises the following steps:

(a) an object is imaged by n cameras to obtain n frames of images and these images are output as image data, n being an integer equal to or greater than 3;

(b) the image data is received and feature points of the object on the n frames of images are respectively extracted;

(c) one of the n cameras is defined as a basic camera, the image taken by the basic camera as a basic image, the other remaining cameras as reference cameras, the images taken by the reference cameras as reference images, and a backprojection line, which passes through the optical center of the basic camera and selected one of feature points in the basic image chosen in correspondence to a noted three-dimensional feature point on the object, is defined as a basic backprojection line;

(d) the basic backprojection line is projected onto the reference images, thereby defining epipolar lines on the reference images, respectively;

(e) backprojection lines, which pass through feature points on the epipolar lines on the reference images and the optical centers of the reference cameras, are defined as reference backprojection lines;

(f) the coordinates of intersections of the basic backprojection line and the reference backprojection lines are respectively calculated, the numbers of intersections of the basic backprojection line and the reference backprojection lines at the respective intersections are counted, and the intersection of the maximum count value is determined to be the position of the above-mentioned noted three-dimensional feature point; and (g) a sequence of steps (c) through (f) are repeated for each feature point on the basic image to obtain the positions of the respective three-dimensional feature points on the object as its three-dimensional information.

A method according to a second aspect of the invention comprises the following steps:

(a) an object is imaged by n cameras to obtain n frames of images and these images are output as image data, n being an integer equal to or greater than 3;

(b) the image data is received and feature points on the object on the n frames of images are respectively extracted;

(c) one of the n cameras is defined as a basic camera, the image taken by the basic camera as a basic image, the other remaining cameras as reference cameras, the images taken by the reference cameras as reference images, and a backprojection line, which passes through the optical center of the basic camera and a feature point in the basic image chosen in correspondence to a noted three-dimensional feature point on the object, is defined as a basic backprojection line;

(d) the basic backprojection line is projected onto the reference images, thereby defining epipolar lines on the reference images, respectively;

(e) backprojection lines, which pass through feature points on the epipolar lines on the reference images and the optical centers of the reference cameras, are defined as reference backprojection lines;

(f) the coordinates of intersections of the basic backprojection line and the reference backprojection lines are respectively calculated, the distribution of the intersections along the basic backprojection line is filtered by convolution to emphasize the concentration of the distribution of the intersections, and the position where the filtered distribution of the intersection is maximum is determined to be the position of the above-mentioned noted three-dimensional feature point; and (g) a sequence of steps (c) through (f) are repeated for each feature point on the basic image to obtain the positions of the respective three-dimensional feature points on the object as its three-dimensional information.

A three-dimensional information recovery apparatus according to the present invention comprises:

n camera means disposed at different positions, for capturing images of an object and for outputting the images as image data, n being an integer equal to or greater than 3; and image information processing means supplied with the image data from the n camera means, for acquiring or recovering three-dimensional information of the object from feature points in the respective images;

the image information processing means comprising:

feature extracting means for extracting feature points in the images;

basic backprojection line generating means wherein one of the n cameras is defined as a basic camera, the image taken by the reference camera as a basic image, the other remaining cameras as reference cameras and the images taken by the reference cameras as reference images and whereby a backprojection line, which passes through the optical center of the basic camera and a feature point in the basic image chosen in correspondence to the above-said noted three-dimensional feature point on the object, is obtained as a basic backprojection line;

epipolar line generating means for projecting the basic backprojection line onto the reference images to obtain epipolar lines;

reference backprojection line generating means for obtaining, as reference backprojection lines, backprojection lines which pass through feature points on the epipolar lines on the reference images and the optical centers of the reference cameras;

three-dimensional feature extracting means for calculating the coordinates of intersections of the basic backprojection line and the reference backprojection lines, for counting the numbers of intersections of the basic backprojection line and the reference backprojection lines at the respective intersections and for determining the intersection of the maximum count value to be the position of the noted three-dimensional feature point;

whereby the positions of respective three-dimensional feature points on the object, corresponding to respective feature points on the basic image, are obtained as three-dimensional information of the object.

An apparatus according to a fourth aspect of the present invention comprises:

n cameras means disposed at different positions, for capturing images of an object and for outputting the images as image data, n being an integer equal to or greater than 3; and image information processing means supplied with the image data from the n camera means, for acquiring or recovering three-dimensional information of the object from feature points in the respective images;

the image information processing means comprising:

feature extracting means for extracting feature points in the images;

basic backprojection line generating means wherein one of the n cameras is defined as a basic camera, the image taken by the basic camera as a basic image, the other remaining cameras as reference cameras, the images taken by the reference cameras as reference images and whereby a backprojection line, which passes through the optical center of the basic camera and a feature point in the basic image chosen in correspondence to the above-said noted three-dimensional feature point on the object, is obtained as a basic backprojection line;

epipolar line generating means for projecting the basic backprojection line onto the reference images to obtain epipolar lines;

reference backprojection line generating means for obtaining, as reference backprojection lines, backprojection lines which pass through feature points on the epipolar lines on the reference images and the optical centers of the reference cameras;

filtering means which calculates the coordinates of intersections of the basic backprojection line and the reference backprojection lines, respectively, and filters the distribution of the intersections along the basic backprojection line by convolution to emphasize the concentration of the distribution of the intersections; and three-dimensional feature extracting means whereby the position where the filtered distribution of intersection is maximum is determined to be the position of the noted three-dimensional feature point;

whereby the positions of respective three-dimensional feature points on the object, corresponding to respective feature points on the basic image, are obtained as three-dimensional information of the object.

With the three-dimensional moving object information reconstructing methods and apparatuses according to the present invention, since the backprojection area is substantially limited by the introduction of a constraint of projective geometry, the interference of backprojection is minimized and three-dimensional information can be acquired by backprojection using a small number of images. Accordingly, the present invention permits reduction of the number of cameras needed to obtain ever-changing three-dimensional information of a moving object through simultaneous image capturing by a plurality of cameras.

DESCRIPTION OF THE PREFERRED EMBODIMENTS

Figure 1:
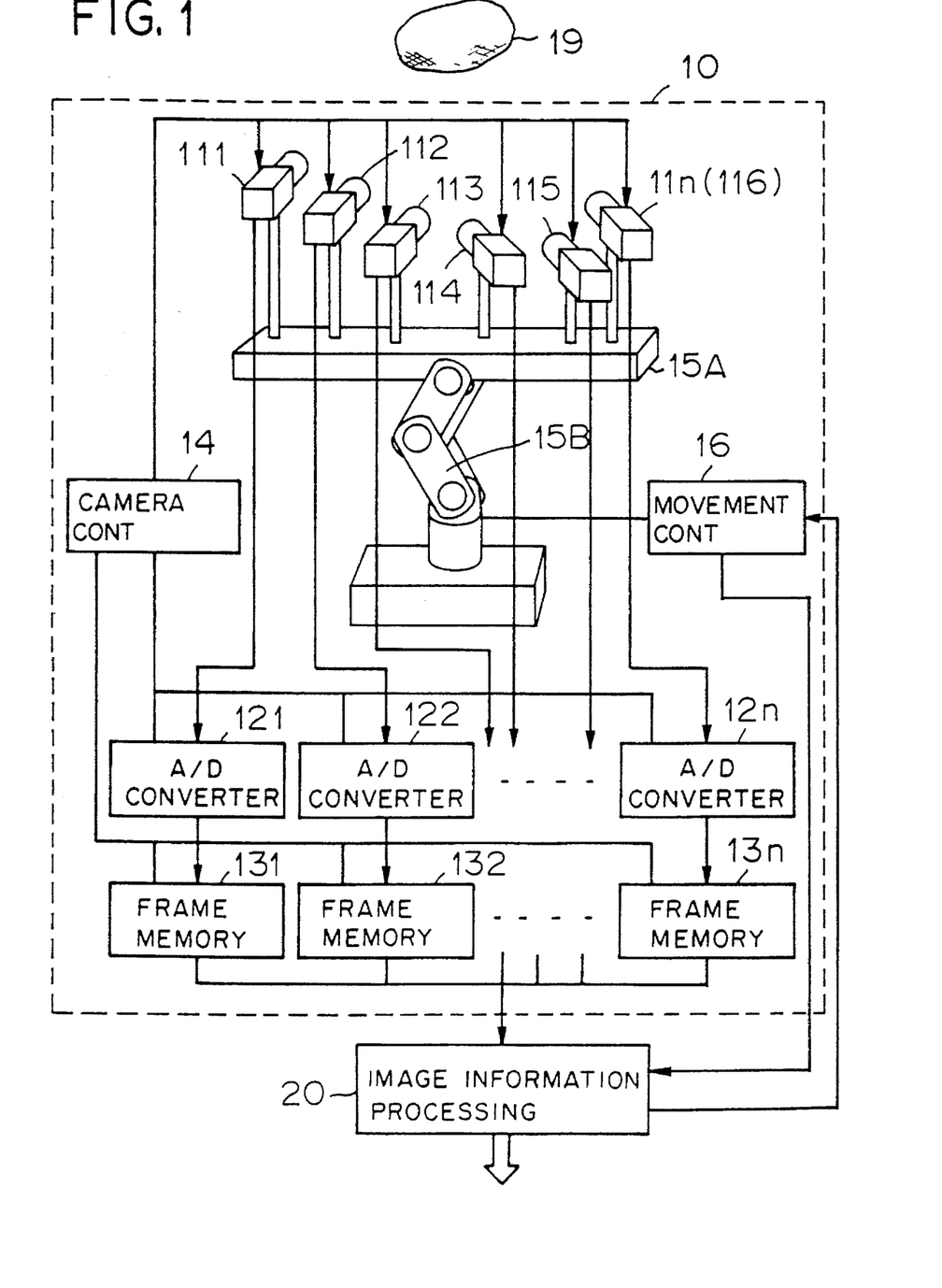
FIG. 1 is a block diagram illustrating the configuration of an embodiment of the three-dimensional information reconstructing apparatus according to the present invention.

In FIG. 1 there is shown in block form an embodiment of the three-dimensional information reconstructing apparatus according to the present invention. The illustrated apparatus is made up of an image input part 10 and an image information processing part 20. The image input part 10 is composed of n (n being an integer equal to or greater than 3) image capturing parts (for example, TV cameras, hereinafter referred to simply as cameras) 11₁ through 11n, A/D converters 12₁ through 12n, frame memories 13₁ through 13n, a camera controller 14, a movable table 15A, a driver 15B and a movement controller 16. The cameras 11₁ through 11n are mounted on the common moving table 15A at different heights. The moving table 15A is designed to be movable three-dimensionally by the driver 15A formed by a robot arm under the control of the movement controller 16.

The cameras 11₁ through 11n simultaneously capture images of an object 19 at a fixed period (or frame period) and each outputs an analog image signal. When the object 19 is not moving, its images need not always be captured simultaneously. The analog signals from the cameras 11₁ through 11n are converted by the A/D converters 12₁ through 12n into digital signals, which are stored, as image data for each frame, in the frame memories 13₁ through 13n. The operations of these cameras, A/D converters and frame memories are placed under the control of the camera controller 14. The image information processing part 20 is supplied with the image data read out of the frame memories 13₁ through 13n and obtains three-dimensional information of the object 19 by performing a process described below with reference to FIG. 2.

Figure 2:
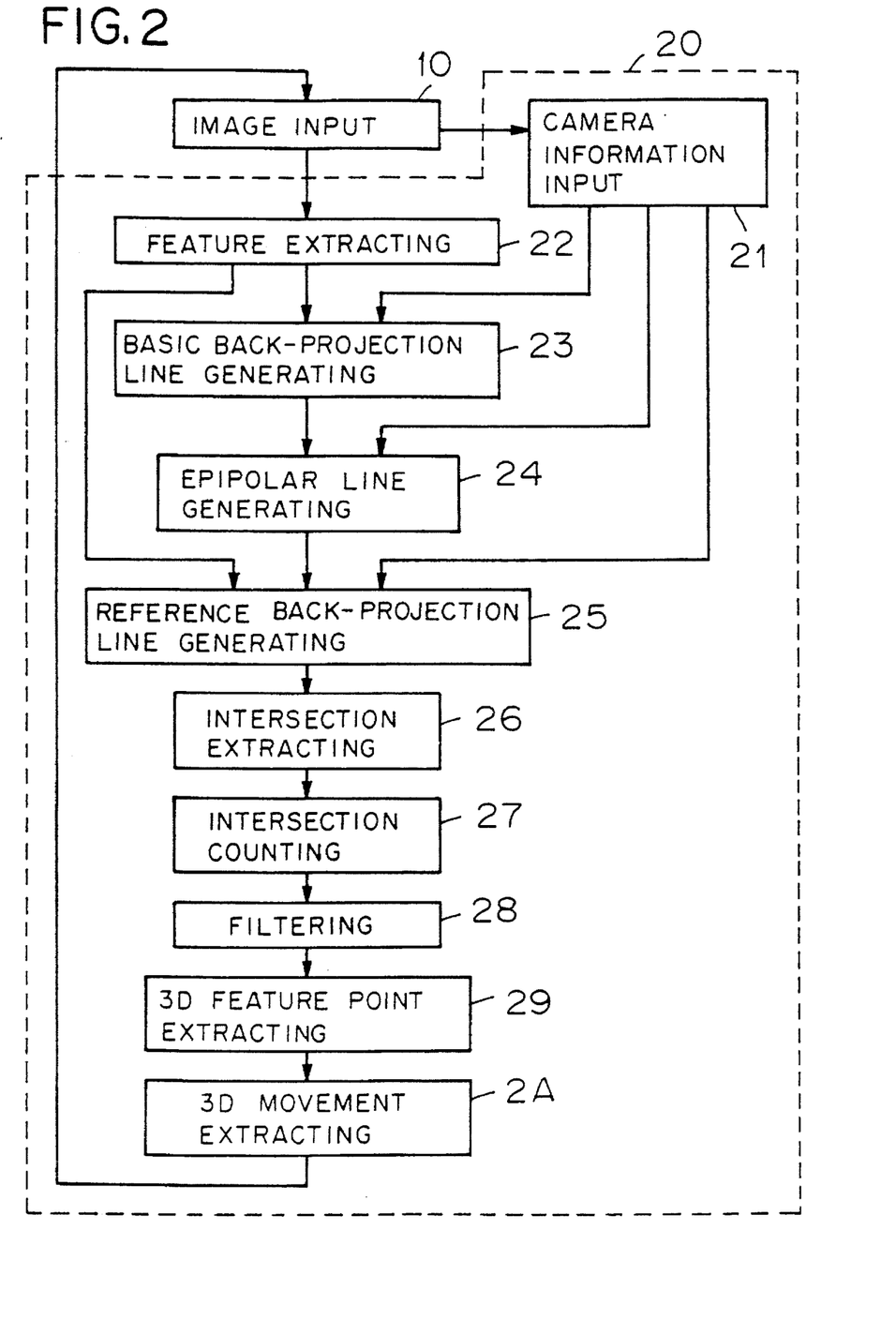
FIG. 2 is a processing block diagram for explaining in detail an image information processing part 20 in FIG. 1.

FIG. 2 shows, in the form of functional blocks, the procedure of processing by the image information processing part 20 formed by a computer. Position and attitude information of the cameras at the time of inputting images of the object 19 by the cameras 11₁ through 11n is inputted into a camera information input part 21 of the image information processing part 20 from the movement controller 16. On the other hand, image data read out of the frame memories 13₁ through 13n are fed to a feature extracting part 22. The feature extracting part 22 extracts feature points (such as isosbestic points and regions of normal images and isosbestic points and regions of thermal images) from the n frames of images inputted from the image input part 10. A basic backprojection line generating part 23 selects, as a basic image, an arbitrary one of the n frames of images from which the feature points have been extracted and generates a basic backprojection line which passes through a feature point on the basic image and the optical center of the camera having taken the basic image inputted from the camera information input part 21 (which camera will hereinafter be referred to as a basic camera). An epipolar line generating part 24 provides epipolar lines which are generated by projecting the above-mentioned basic backprojection line onto images (reference images) taken by cameras (reference cameras) other than the basic camera. A reference backprojection line generating part 25 provides all reference backprojection lines which pass through feature points on the epipolar lines on the reference images or within a certain distance range on either side of the epipolar lines and optical centers of the reference cameras corresponding to the epipolar lines. An intersection extracting part 26 calculates the coordinates of all intersections of the basic backprojection line generated by the basic backprojection line generating part 23 and the reference backprojection lines generated by the reference backprojection line generating part 25. An intersection counting part 27 counts the number of intersections at intersecting points or regions of the basic backprojection line and the reference backprojection lines extracted by the intersection extracting part 26 along the basic backprojection line. A filtering part 28 filters, along the basic backprojection line, the intersection count distribution provided by the intersection counting part 27. A three-dimensional feature extracting part 29 determines, as the position of a three-dimensional feature point, one of the intersections which is closest to the peak position where the filtered intersection distribution exceeds a fixed threshold value. A three-dimensional movement extracting part 2A calculates movement of each three-dimensional feature point and region on the basis of each three-dimensional feature point and region information at every time interval extracted by the three-dimensional feature extracting part 29.

Figure 3:
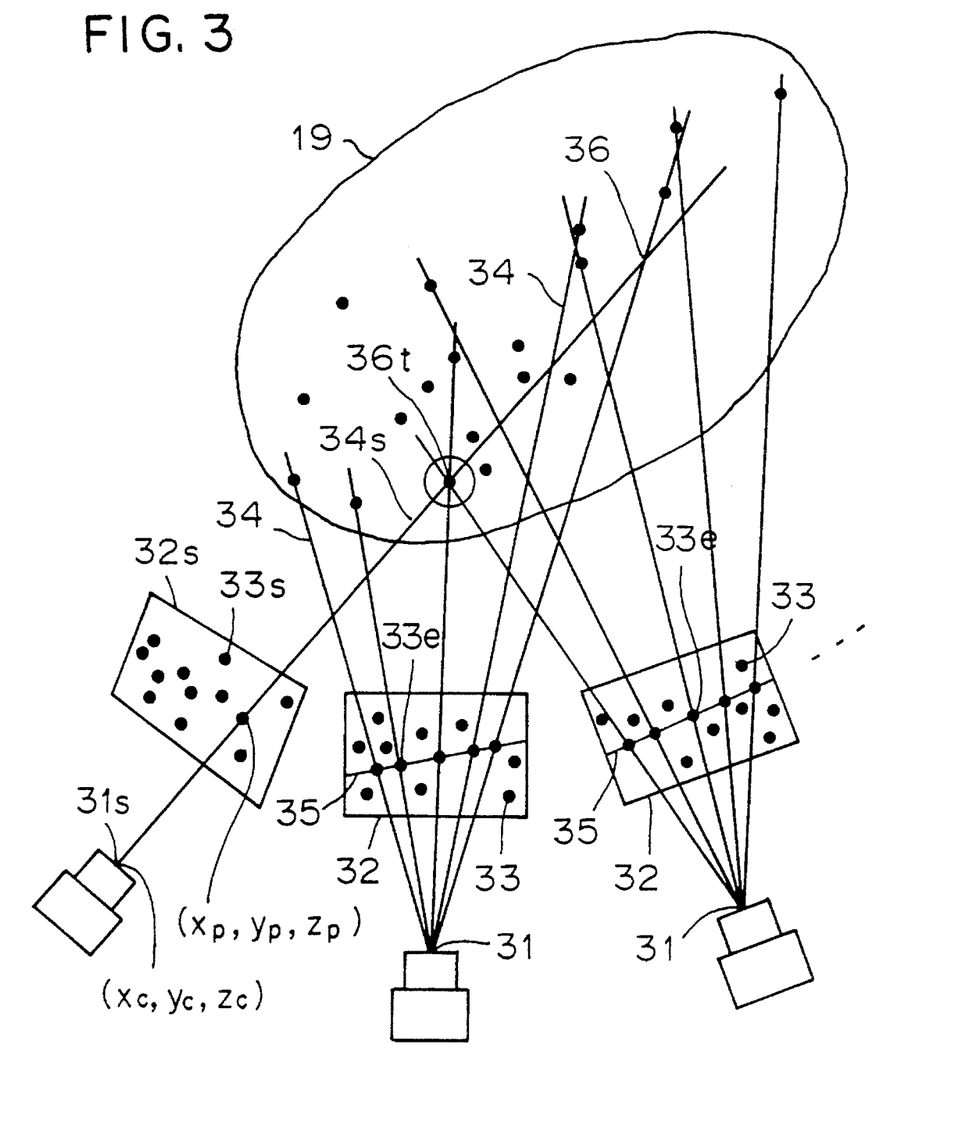
FIG. 3 is a backprojection diagram for explaining the principles of the present invention.

Next, the operation of this invention apparatus of such a construction will be described with reference to FIGS. 1, 2 and 3. In FIG. 3 inverted images formed on focal planes of the cameras 11₁ through 11n disposed as depicted are imaginarily projected back forwardly of the cameras and shown, for convenience's sake, as erect images 32. The camera controller 14 simultaneously activates the n cameras 11₁ through 11n from an input time t, converts the resulting analog image signals by the A/D converters 12₁ through 12n into digital image signals and captures them into the n frame memories 13₁ through 13n to obtain image data of one frame in each memory. The camera information input part 21 obtains camera information at the time t through calibration (see, for example, J. Weng and P. Cohen and M. Herniou: "Calibration of stereo cameras using a non-linear distortion model," Proc. ICCV, pp. 246–253, 1990).

By the feature extracting part, feature points on each image 32 (for example, isosbestic points and regions in an image, contour lines and regions in a differential image and isothermal points and regions in a thermal image) are extracted. In this example, edges of the image are extracted feature points by a Canny filter (Canny J. F.:"A computational approach to edge detection," IEEE Trans. PAMI, Vol. 8, No. 6, pp. 679–698, 1986). Next, the basic backprojection generating part 23 selects an image 32 of an arbitrary one of the n frames as a basic image 32s and calculates a backprojection line 34s which passes through one noted feature point on the basic image 32s and the optical center 31s of the camera (that is, the basic camera) corresponding to the image 32s which is inputted from the camera information input part 21. The coordinates $(x_b, y_b, z_b)$ of an arbitrary point on the backprojection line 34s satisfy the following equation:

$$\frac{x_b - x_c}{x_p - x_c} = \frac{y_b - y_c}{y_p - y_c} = \frac{z_b - z_c}{z_p - z_c} \quad (1)$$

where $(x_p, y_p, z_p)$ and $(x_c, y_c, z_c)$ are coordinates of the noted feature point on the image 32s and the optical center 31s of the basic camera, respectively. Such a backprojection line 34s will hereinafter be referred to as a basic backprojection line. An arbitrary point $E=(x_e, y_e)$ on an epipolar line, which is obtained by projecting the basic backprojection line onto each reference image, has such relations as shown below.

$$E = R^T(B' - T) \quad (2)$$

$$R^T = \begin{pmatrix} r_{11} \, r_{21} \\ r_{12} \, r_{22} \end{pmatrix}$$

$$T = (t_1, t_2)^T$$

where $R^T$ and T' are a two-dimensional expression of a transposed version of a matrix which defines the rotation of the camera optical axis with respect to the coordinate system and a two-dimensional expression of a vector which defines the translation of the camera optical axis with respect to the coordinate system, respectively, and $B'=(X_b, y_b)^T$ is a two-dimensional expression of an arbitrary point on the backprojection line. As is evident from FIG. 3, the basic backprojection line 34s is present in a plane containing the optical center 31 of every reference camera and the epipolar line 35 by the reference camera. This plane will hereinafter be called an epipolar plane by the reference camera. Three-dimensional feature points on the object 19 present in an extension plane of the epipolar plane of each camera are all projected onto the epipolar line 35 of the camera. Next, the reference backprojection line generating part 25 detects all feature points 33 on the above-mentioned epipolar line 35. One of these feature points 33e on the epipolar line 35 corresponds to the noted feature point 33s. In practice, however, there are cases where these feature points are not on the epipolar line because of an image quantization error. Accordingly, feature points within a fixed distance from the epipolar line 35 are also regarded as its feature points 33e. This is followed by obtaining backprojection lines 34 which pass through the feature points 33e on the epipolar line 35 in the image 32 by each reference camera and the optical center 31 of the reference camera. These backprojection lines 34 will hereinafter be referred to as reference backprojection lines.

Next, the intersection extracting part 26 calculates the coordinates of intersections of the basic backprojection line 34s and the reference backprojection lines 34. Owing to the presence of an feature extraction error on each image 32 and an error in the optical center of each camera, the situation occasionally arises where the basic backprojection line 34s and the reference backprojection lines 34 do not intersect in the three-dimensional space. In this embodiment, the shortest distance between the basic backprojection line 34s and each reference backprojection line 34 is calculated and if this shortest distance is smaller than a fixed threshold value, the basic backprojection line 34s and the reference backprojection line 34 concerned are regarded as intersecting each other. That is, if the rank of the following matrix with two arbitrary points $B_{b1}=(x_{b1}, y_{b1}, z_{b1})^T$ and $B_{b2}=(x_{b2}, y_{b2}, z_{b2})$ on the basic backprojection line 34s and two arbitrary points $B_{r1}=(x_{r1}, y_{r1}, z_{r1})$ and $B_{r2}=(x_{r2}, y_{r2}, z_{r2})$ on the reference backprojection line 34 is 1, these two lines do not extend parallel to each other.

$$\begin{pmatrix} x_{b2} - x_{b1} & y_{b2} - y_{b1} & z_{b2} - z_{b1} \\ x_{r2} - x_{r1} & y_{r2} - y_{r1} & z_{r2} - z_{r1} \end{pmatrix} \quad (3)$$

In this instance, two points $(x_{bs}, y_{bs}, z_{bs})^T$ and $(x_{rs}, y_{rs}, z_{rs})^T$, which stay on the basic backprojection line 34s and the reference backprojection line 34, respectively, and provide the shortest distance between the two lines, are given as follows:

$$\begin{bmatrix} x_{bs} \\ y_{bs} \\ z_{bs} \end{bmatrix} = \begin{bmatrix} x_{b1} \\ y_{b1} \\ z_{b1} \end{bmatrix} + K_b \begin{bmatrix} x_{b2} - x_{b1} \\ y_{b2} - y_{b1} \\ z_{b2} - z_{b1} \end{bmatrix} \quad (4)$$

$$\begin{bmatrix} x_{rs} \\ y_{rs} \\ z_{rs} \end{bmatrix} = \begin{bmatrix} x_{r1} \\ y_{r1} \\ z_{r1} \end{bmatrix} + K_r \begin{bmatrix} x_{r2} - x_{r1} \\ y_{r2} - y_{r1} \\ z_{r2} - z_{r1} \end{bmatrix} \quad (5)$$

where:

$K_b = (G_r H - F_r G_b)/(F_b F_r - H^2)$ $K_r = (F_b G_r - G_b H)/(F_b F_r - H^2)$ $F_b = (x_{b2} - x_{b1})^2 + (y_{b2} - y_{b1})^2 + (z_{b2} - z_{b1})^2$ $F_r = (x_{r2} - x_{r1})^2 + (y_{r2} - y_{r1})^2 + (z_{r2} - z_{r1})^2$ $G_b = (x_{b2} - x_{b1})(x_{b1} - x_{r1}) + (y_{b2} - y_{b1})(y_{b1} - y_{r1}) + (z_{b2} - z_{b1})(z_{b1} - z_{r1})$ $G_r = (x_{r2} - x_{r1})(x_{r1} - x_{b1}) + (y_{r2} - y_{r1})(y_{r1} - y_{b1}) + (z_{r2} - z_{r1})(z_{r1} - z_{b1})$ $H = (x_{b2} - x_{b1})(x_{r1} - x_{r2}) + (y_{b2} - y_{b1})(y_{r1} - y_{r2}) + (z_{b2} - z_{b1})(z_{r1} - z_{r2})$

If the distance d between these two points satisfies the condition that it be smaller than a threshold value $\lambda$ as shown below, $$d = \{(x_{bs} - x_{rs})^2 + (y_{bs} - y_{rs})^2 + (z_{bs} - z_{rs})^2\}^{1/2} < \lambda \quad (6)$$

the basic backprojection line 34s and the reference backprojection line 34 on which these two point stay, respectively, are regarded as intersecting each other, and the coordinates of the position of the intersection 36 are determined to be the midpoint of the distance between the two points.

$x = (x_{bs} + x_{rs})/2$ $y = (y_{bs} + y_{rs})/2$ $z = (z_{bs} + z_{rs})/2 \quad (7)$ Next, the intersection counting part counts the number of intersections of the basic backprojection line 34s and all of the reference backprojection lines 34.

Incidentally, in the case of using images taken by two cameras (n=2), there is the possibility of a plurality of reference backprojection lines 34 intersecting one basic backprojection line 34s at a plurality of positions. In such an instance, it cannot uniquely be determined to which intersection the three-dimensional feature point corresponds, the latter corresponding to the feature point 33s through which the basic backprojection line 34s passes. Now, description will be given of this problem.

In the interests of clarity, let the number of feature points on the epipolar line of each reference camera obtained by projecting the basic backprojection line 34s onto each reference image be represented by M. Only one or none of the M feature points on the epipolar line on the image by each camera correspond to the noted feature point. Now, assume that one of the M feature point on each epipolar line corresponds to the noted feature point. Accordingly, one reference camera provides M reference backprojection lines and the probability that any one of the M intersections of M reference backprojection lines and the basic backprojection line corresponds to a noted feature point is $\beta=1/M$. The same goes for the other reference cameras. Hence, the probability a that one of the reference backprojection lines from every reference camera intersects the basic backprojection line 34s at any intersection thereon is $\alpha=\beta^{n-1}$. When only one feature point is present on the epipolar line of the reference camera (that is, when M=1), that feature point corresponds to the noted feature point and the reference backprojection line intersects the noted feature point; in this case, no problem arises. It is when the number M of reference backprojection lines from each reference camera is 2 or more that matters. Therefore, discussion will be made below on the case where $\beta=1/M$ is in the range of between 0 to 0.5.

Figure 4:
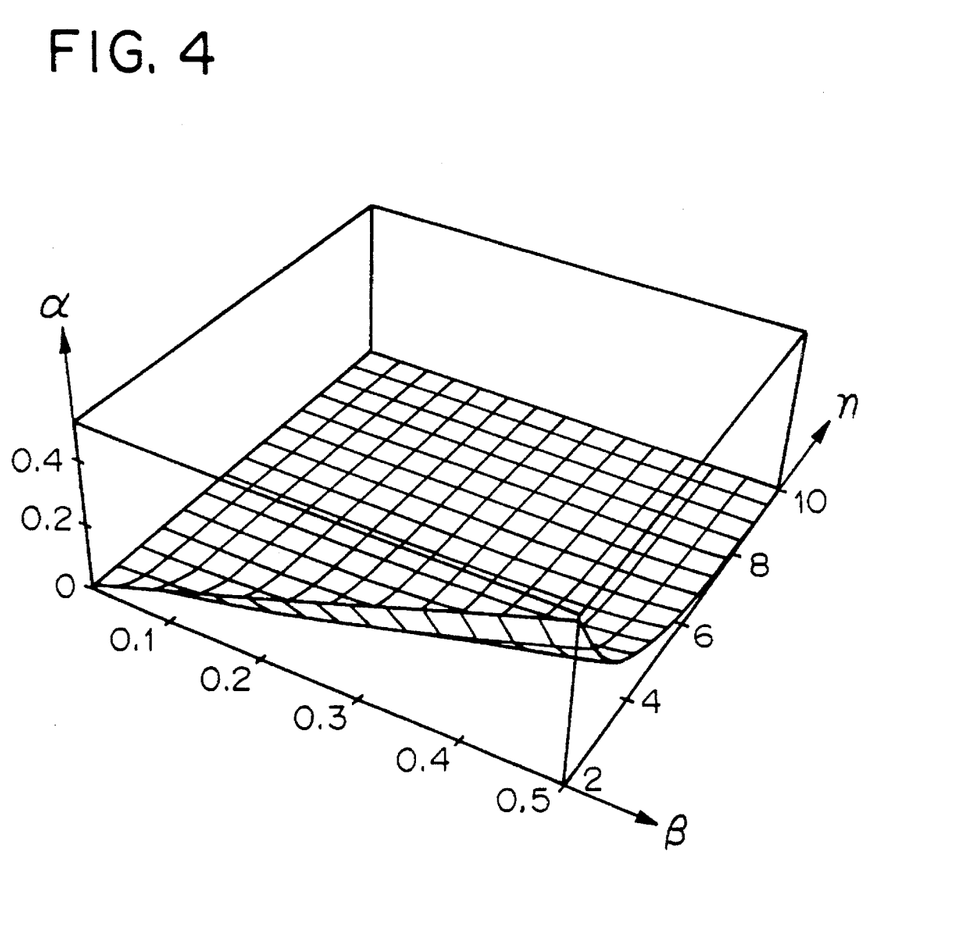
FIG. 4 is a three-dimensional graph for explaining the probability of reference backprojection lines intersecting at the same point.

FIG. 4 is a graph showing the probability $\alpha$ that (n−1) reference backprojection lines from (n−1) reference cameras intersect at one point on the basic backprojection line when the value $\beta$ is in the range of $0<\beta\leq 0.5$. As is evident from the graph, even in the case where $\beta=0.5$, if the number n of all cameras (i.e. the number of viewing points) is equal to or larger than 6, the probability $\alpha$ of five reference backprojection lines from reference cameras intersecting at one point on the basic backprojection line is as negligibly small as $(0.5)^5=0.03$. Also when n=5 (the number of reference cameras is four), the value $\alpha$ is as small as 0.06. That is, the possibility that a plurality of reference backprojection lines from respective reference cameras happen to intersect at the noted feature point decreases rapidly as the number n of cameras increases. Conversely speaking, when the number of reference backprojection lines which actually intersect at a certain point on the basic backprojection line is plural (four or more, for instance), it implies that the intersection is very likely to be a noted feature point. Then, it is possible to uniquely determine or locate the position of the noted three-dimensional feature point by counting in the intersection counting part 27 the number of reference backprojection lines intersecting at each point on the basic backprojection line 34s (hereinafter referred to simply as the intersection number) and then detecting in the three-dimensional feature point extracting part 29 the position providing the maximum intersection number, as described previously. In this way, any given three-dimensional feature point on the object 19 can be made to correspond to a unique intersection on the basic backprojection line.

In view of the above, the value n is set to 3 or larger based on the principles of the present invention, but in a preferred embodiment six different viewing points, that is, six cameras are used. Such a configuration will increase the possibility that a three-dimensional feature point on the object 19, occluded from a particular one of the viewing points or cameras, can also be observed by or seen from the other cameras and hence located.

Figure 5A:
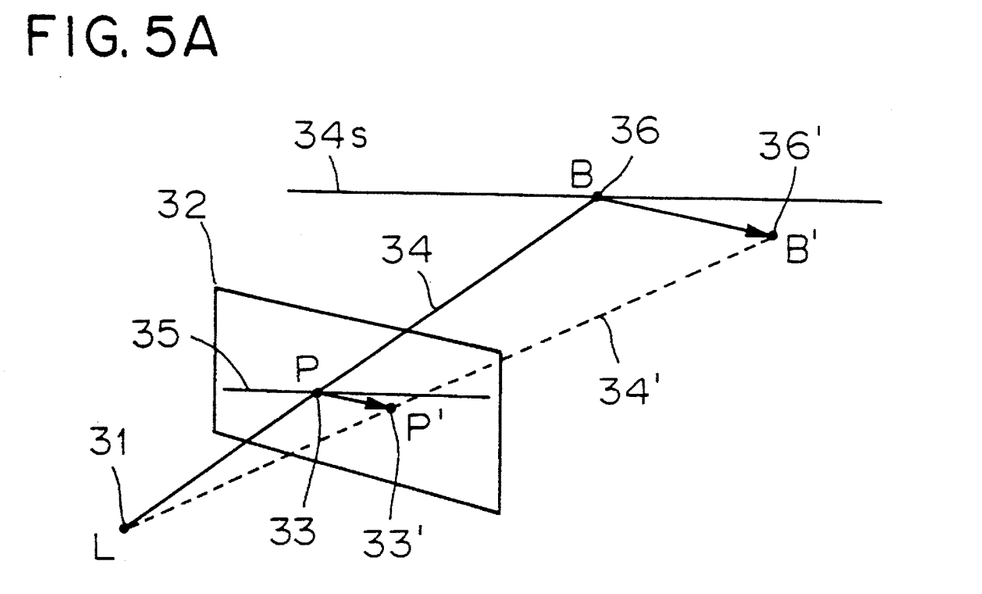
FIG. 5A is a perspective view for explaining a pixel quantization error of a feature point in an image.
Figure 5B:
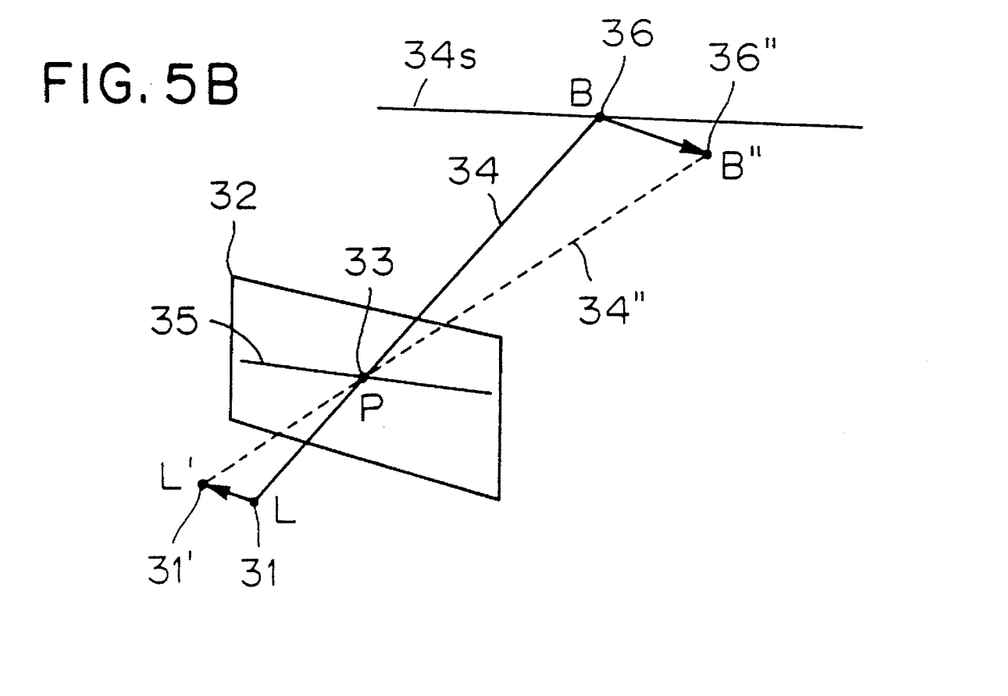
FIG. 5B is a perspective view for explaining an error of the optical center.

In actual measurements, as shown in FIGS. 5A and 5B, backprojection lines may sometimes deviate from their original directions owing to positional errors of the feature points 33 on the image 32 and of the optical center 31 of the camera. For example, since the image 32 composed of image data provided by each camera has been quantized by pixels of the image, the position of each feature point on the image contains a quantization error by the pixels. Now, suppose that the position P of the true feature point 33 on the image 32 by a reference camera deviates to P' due to the quantization error as depicted in FIG. 5A. Since the reference backprojection line 34 rotates and deviates about the optical center 31, it is determined that the true feature point B on the basic backprojection line 34s is at B' (not always on the basic backprojection line 34s). Alternatively, if the optical center determined by measurement deviates to L' from the true optical center L as depicted in FIG. 5B, then the true feature point B on the basic backprojection line 34s will be regarded as lying at B".

Because of the above-mentioned deviation of the reference backprojection line 34 under the influence of such kinds of errors, the feature point 33 mapped onto each image from the same three-dimensional feature point on the object 19 and the reference backprojection line 34 passing through the optical center 31 corresponding to the feature point 33 are likely to intersect at a point other than the true position of the three-dimensional feature point. In such a situation, if the point B' or B" is within a threshold distance from the basic backprojection line 34s, it is likely to be counted at an intersection different from the position of the true noted feature point on the basic backprojection line 34s at the time of counting the intersection number by the intersection counting part 27. In this instance, if the position of the intersection which provides the maximum count value in excess of a predetermined value is directly extracted, as a three-dimensional feature point, by threshold value processing, there is a fear that a three-dimensional feature point other than the noted one is extracted as a pseudo or false three-dimensional feature point.

Since these errors of the backprojection lines scatter randomly in direction and magnitude, however, it can be estimated that the central region of the actually obtainable discrete and expansive count distribution, around which intersections concentrate, is most likely to include the true three-dimensional feature point. It is therefore possible to decrease the likelihood of extracting pseudo or false three-dimensional feature points by filtering the intersection count distribution along the basic backprojection line 34s by the filtering part 28 to emphasize the distribution at points where reference backprojection lines concentratedly intersect the basic backprojection line. To this end, it is possible to use a square filter, a triangular filter, a Gaussian filter, a Laplacian-Gaussian filter and so forth.

Figure 6A:
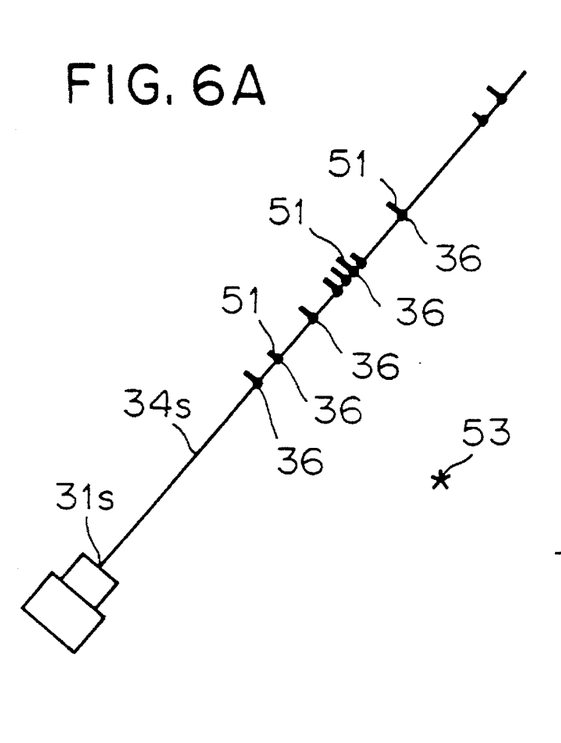
FIG. 6A is a diagram showing the intersection distribution on a basic backprojection line.
Figure 6B:
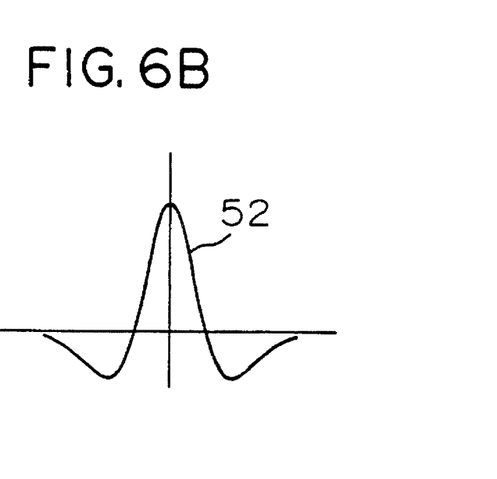
FIG. 6B is a graph showing an example of the characteristic of a filter.
Figure 6C:
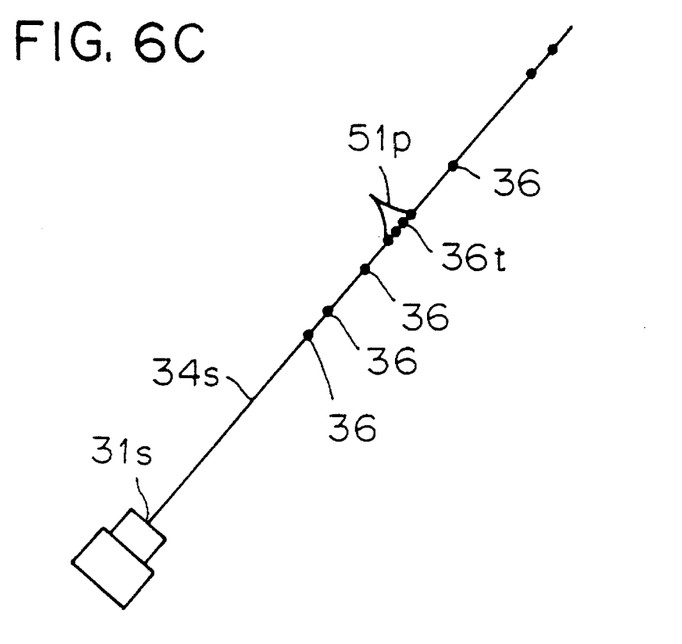
FIG. 6C is a diagram showing an example of a filtered intersection distribution.

For the discrete distribution P(s) of intersection counts 51 along the basic backprojection line 34s, such as shown in FIG. 6A, the filtering process using a function f(t) can be done by a convolution based on the following equation.

$$P'(s)=\int P(s-t)\cdot f(t)dt \qquad (7)$$

where P(s) and P'(s) are the distributions of backprojection line intersection counts before and after the convolution of the function f(t), respectively, and s is the position along the basic backprojection line 34s. The filter function f(t) can be obtained with such various filters as mentioned above. In this embodiment, a Laplacian-Gaussian filter (commonly called a $\nabla^2 G$ filter) 52, which has such a characteristic as shown in FIG. 6B, is used to perform the convolution with the distribution of the intersection counts 51 along the basic backprojection line 34s. Since the $\nabla^2 G$ filter has a property of emphasizing peaks of a continuous waveform while suppressing high-frequency discrete noise, the convolution suppresses discrete intersection counts and emphasizes peaks of highly concentrated intersection counts as shown in FIG. 6C. Thus, the extraction of a false three-dimensional feature point can be prevented by detecting peaks 51p of the intersection counts on the basic backprojection line 34s in the three-dimensional feature extracting part 29 and then determining that the intersection closest to the peak position concerned is the position of the noted three-dimensional feature point.

As described above, intersections of the basic backprojection line 34s and the reference backprojection lines 34 from the reference cameras are defined on the basic backprojection line 34s and the number of intersections at each intersection is counted. In practice, however, owing to the aforementioned optical center error or pixel quantization error at the feature point, the intersection of one of the reference backprojection lines 34 from every reference camera and the basic backprojection line 34s, corresponding to the true noted three-dimensional feature point, does not become one in the strict sense. Then, in the case of counting the number of intersections at each point of intersection, it is necessary to divide the basic backprojection line 34s lengthwise thereof every predetermined small unit length $\Delta s$ and count the intersection number in each divided unit length $\Delta s$. In this case, since the resolution for the intersections increases with a decrease in the unit length $\Delta s$, the number of intersections present in the same divided unit of length As on the basic backprojection line 34s will decrease. When the unit length $\Delta s$ is selected small to such an extent that all intersections are separated, the maximum intersection number at each intersection goes one and the noted three-dimensional feature point cannot uniquely be identified. Also in this instance, however, intersections cluster about the noted three-dimensional feature point as shown in FIG. 6A, for example; hence, the filtering convolution for the discrete distribution of intersections, such as described above, provides a peak at the center of the intersection clustering region, making it possible to determine that the intersection closest to the peak position is the position of the true three-dimensional feature point.

By repeating the above-described process for each of the feature points 33s on the basic image 32s, the coordinates of all three-dimensional feature points 36t corresponding to all the feature points 33s on the basic image 32s can be determined. In this case, the backprojection lines which intersect at the position determined to correspond to the noted three-dimensional feature point are related only to the noted three-dimensional feature-point. Consequently, by removing the feature points 33 and 33s on the images 32 and 32s corresponding to the three-dimensional feature points determined immediately before obtaining other three-dimensional feature points, it is possible to reduce the interference of backprojection and the computational cost. Furthermore, by selecting another image as a basic one and repeating the above-described process until all images are selected, it is possible to obtain the positions of three-dimensional feature points corresponding to feature points on images obtained from all of the viewing points, that is, taken by all of the cameras used.

Finally, the three-dimensional movement extracting part 2A extracts three-dimensional movement information of the moving object by calculating temporal changes of the three-dimensional feature point information available from the three-dimensional feature extracting part 29. A concrete method therefor can be implemented by a three-dimensional extended version of a two-dimensional movement information extracting method (see, for example, R. Agarwal and J. Sklansky: "Optical flow estimation by the clustering of constraint sets in velocity space," Technical Report TP-91-2, Department of Electrical and Computer Engineering, Pattern Recognition and Image Modelling Project, University of California, Irvine, Calif., USA).

Moreover, it is also possible to carry out tracking of a moving object by repeating operations of: inputting the three-dimensional movement information from the three-dimensional movement extracting part 2A into the movement controller 16 of the image input part 10; planning the next viewing point; activating the driver 15 to move the plurality of image capturing parts 111 through 11n and, at the same time, measuring the movement of the driver 15 at an input time t+w; and inputting the measured value into the camera information input part.

As described above, according to the present invention, since the backprojection area is substantially limited by the introduction of a projective geometric constraint, the interference of backprojection is minimized, and consequently, three-dimensional information can be obtained by backprojection onto a small number of images. Hence, the ever-changing three-dimensional shape of a moving object can be recovered by simultaneous image pickup with a small number of cameras.

It will be apparent that many modifications and variations may be effected without departing from the scope of the novel concepts of the present invention.

What is claimed is:

1. A method of obtaining three-dimensional information of an object by capturing images of said object by a plurality of cameras and making three-dimensional feature points on said object to correspond to feature points in said images, said method comprising the steps:

(a) imaging said object by n cameras to obtain n frames of images and outputting said images as image data, said n being an integer equal to or greater than 3;

(b) receiving said image data and extracting feature points of said object on said n frames of images respectively;

(c) defining one of said n cameras as a basic camera, defining the image picked up by said basic camera as a basic image, defining the other remaining cameras as reference cameras, defining the images captured by said reference cameras as reference images, and defining a backprojection line, which passes through the optical center of said basic camera and a feature point in said basic image chosen in correspondence to a noted three-dimensional feature point on said object, as a basic backprojection line;

(d) projecting said basic backprojection line onto said reference images to define thereon epipolar lines, respectively;

(e) defining backprojection lines, which pass through said feature points on said epipolar lines on said reference images and optical centers of said reference cameras, as reference backprojection lines;

(f) calculating the coordinates of intersection points of said basic backprojection line and said reference backprojection lines, counting the numbers of intersections of said basic backprojection line and said reference backprojection lines at their respective intersection points, and determining the intersection point of the maximum count value to be the position of said noted three-dimensional feature point; and (g) repeating said steps (c) through (f) for each of said feature points on said basic image to obtain the positions of said three-dimensional feature points on said object as its three-dimensional information.

2. A method of obtaining three-dimensional information of an object by capturing images of said object by a plurality of cameras and making three-dimensional feature points on said object to correspond to feature points in said images, said method comprising the steps:

(a) imaging said object by n cameras to obtain n frames of images and outputting said images as image data, said n being an integer equal to or greater than 3;

(b) receiving said image data and extracting feature points of said object on said n frames of images, respectively;

(c) defining one of said n cameras as a basic camera, defining the other remaining cameras as reference cameras, defining the images captured by said reference cameras as reference images, and defining a backprojection line, which passes through the optical center of said basic camera and a feature point in said basic image chosen in correspondence to a noted three-dimensional feature point on said object, as a basic backprojection line;

(d) projecting said basic backprojection line onto said reference images to define thereon epipolar lines, respectively;

(e) defining backprojection lines, which pass through said feature points on said epipolar lines on said reference images and optical centers of said reference cameras, as reference backprojection lines;

(f) calculating the coordinates of intersection points of said basic backprojection line and said reference backprojection lines, filtering the distribution of said intersection points along said basic backprojection line by convolution to emphasize the concentration of said distribution of said intersection points, and determining the position where said filtered distribution of the intersection points is maximum to be the position of said noted three-dimensional feature point; and (g) repeating said steps (c) through (f) for each of said feature points on said basic image to obtain the positions of said three-dimensional feature points on said object as its three-dimensional information.

3. The method of claim 1 or 2, wherein a position on said basic backprojection line is defined every predetermined unit length of said basic backprojection line lengthwise thereof and the number of intersections at each of said intersection points is the number of intersections in said unit length at the position on said basic backprojection line through which said reference backprojection lines pass.

4. The method of claim 3, wherein said reference backprojection lines intersecting with said basic backprojection line are reference backprojection lines lying within a predetermined range of distance from said basic backprojection line.

5. The method of claim 1, wherein said step of counting said number of intersections is a step of filtering the distribution of said intersections along said basic backprojection line by convolution to emphasize the concentration of said distribution of said intersections and determining the position where said filtered distribution of said intersections is maximum to be the position of said noted three-dimensional feature point.

6. The method of claim 2 or 5, wherein said step of filtering is performed by a Laplacian-Gaussian filter.

7. The method of claim 2 or 5, wherein said step of filtering is performed by a square filter.

8. The method of claim 2 or 5, wherein said step of filtering is performed by a triangular filter.

9. The method of claim 2 or 5, wherein said step of filtering is performed by a Gaussian filter.

10. The method of claim 1 or 2 wherein said step (g) includes a step of removing, after said feature point corresponding to said noted three-dimensional feature point is identified by performing said series of steps (c) through (f), said identified feature point from candidates for processing in the subsequent repetition of said steps (c) through (f).

11. The method of claim 1 or 2, wherein the number n of said cameras is in the range of from 5 to 8.

12. The method of claim 1 or 2, further comprising a step of newly repeating, upon each completion of said step (g), said step (g) for every one of said cameras, using one of said reference cameras as a new basic camera and said basic camera as a new reference camera.

13. The method of claim 1 or 2, further comprising a step of obtaining upon each repetition of simultaneous capturing of images of said object by said n cameras at a fixed period, three-dimensional information of said object following said series of steps.

14. A three-dimensional information reconstructing apparatus comprising:

n camera means disposed at different positions, for capturing images of an object and for outputting said images as image data, said n being an integer equal to or greater than 3; and image information processing means supplied with said image data from said n camera means, for acquiring three-dimensional information of said object from feature points in said images;

said image information processing means comprising:

feature extracting means for extracting said feature points in said images;

basic backprojection line generating means wherein one of said n camera means is defined as a basic camera, the image captured by said basic camera means as a basic image, the other remaining camera means as reference camera means, the images captured by said reference camera means as reference images, and whereby a backprojection line, which passes through the optical center of said basic camera means and a feature point in said basic image chosen in correspondence to a noted three-dimensional feature point on said object, is obtained as a basic backprojection line;

epipolar line generating means for projecting said basic backprojection line onto said reference images to obtain epipolar lines;

reference backprojection line generating means for obtaining, as reference backprojection lines, backprojection lines which pass through feature points on said epipolar lines on said reference images and the optical centers of said reference camera means; and three-dimensional feature extracting means for calculating the coordinates of intersection points of said basic backprojection line and said reference backprojection lines, for counting the number of intersections of said basic backprojection line and said reference backprojection lines at each of said intersection points and for determining that one of said intersection points which has the maximum count value is the position of said noted three-dimensional feature point;

whereby the positions of respective three-dimensional feature points on said object, corresponding to respective feature points on said basic image, are obtained as said three-dimensional information of said object.

15. A three-dimensional information reconstructing apparatus comprising:

n camera means disposed at difference positions, for capturing images of an object and for outputting said images as image data, said n being an integer equal to or greater than 3; and image information processing means supplied with said image data from said n camera means, for acquiring three-dimensional information of said object from feature points in said images;

said image information processing means comprising:

feature extracting means for extracting feature points in said images;

basic backprojection line generating means wherein one of said n camera means is defined as a basic camera means, the image captured by said basic camera means as a basic image, the other remaining camera means as reference cameras, the images captured by said reference camera means as reference images, and whereby a backprojection line, which passes through the optical center of said basic camera means and a feature point in said basic image chosen in correspondence to a noted three-dimensional feature point on said object, is obtained as a basic backprojection line;

epipolar line generating means for projecting said basic backprojection line onto said reference images to obtain epipolar lines;

reference backprojection line generating means for obtaining, as reference backprojection lines, backprojection lines which pass through feature points on said epipolar lines on said reference images and the optical centers of said reference camera means;

filtering means which calculates the coordinates of intersection points of said basic backprojection line and said reference backprojection lines, respectively, and filters the distribution of said intersection points along said basic backprojection line by convolution to emphasize the concentration of said distribution of said intersection points; and three-dimensional feature extracting means whereby the position where said filtered distribution of said intersection points is maximum is determined to the position of said noted three-dimensional feature point;

whereby the positions of respective three-dimensional feature points on said object, corresponding to respective feature points on said basic image, are obtained as said three-dimensional information of said object.

16. The apparatus of claim 14, wherein said feature extracting means includes filter means for emphasizing the concentration of said distribution of intersections by convolution along said basic backprojection line and the position where said filtered distribution of intersections is maximum is determined to be the position of said noted three-dimensional feature point.

17. The method of claim 15 or 16, wherein said filter means is a Laplacian-Gaussian filter.

18. The apparatus of claim 15 or 16, wherein said filter means is square filter.

19. The apparatus of claim 15 or 16, wherein said filter means is a triangular filter.

20. The apparatus of claim 15 or 16, wherein said filter means is a Gaussian filter.

21. The method of claim 14 or 15, wherein said number n of cameras means is in the range of from 5 to 8.

22. The apparatus of claim 14 or 15, further comprising camera control means for repeating simultaneous image capturing of said object by said n camera means at a fixed period and for supplying said image data to said image information processing means upon each generation of said image data.

* * * * *